(12) United States Patent
Thimm et al.

(10) Patent No.: US 6,313,799 B1
(45) Date of Patent: Nov. 6, 2001

(54) DIAGNOSTIC DEVICE FOR A MULTI-ANTENNA ARRANGEMENT

(75) Inventors: Peter Thimm, Nordstemmen; Martin Wagner, Bad Salzdetfurth, both of (DE)

(73) Assignee: Fuba Automotive GmbH & Co. KG, Bad Salzdetfurth (DE)

( * ) Notice: Subject to any disclaimer, the term of this patent is extended or adjusted under 35 U.S.C. 154(b) by 0 days.

(21) Appl. No.: 09/604,949

(22) Filed: Jun. 27, 2000

(30) Foreign Application Priority Data

Jul. 2, 1999 (DE) .............................. 199 30 571

(51) Int. Cl.[7] ...................................................... H01Q 1/32
(52) U.S. Cl. ................................................................ 343/703
(58) Field of Search ................................... 343/703, 713; 455/277; H01Q 1/00, 1/32

(56) References Cited

U.S. PATENT DOCUMENTS 5,864,319 * 1/1999 Paulus .................................. 343/703

FOREIGN PATENT DOCUMENTS

| 195 13 872 | 10/1996 | (DE) . |
| 299 11 085 | 10/1999 | (DE) . |
| 0 806 849 | 4/1997 | (EP) . |

* cited by examiner

Primary Examiner—Michael C. Wimer
(74) Attorney, Agent, or Firm—Collard & Roe, P.C.

(57) ABSTRACT

A diagnostic device having a diversity processor for individually testing the electrical condition of the connections of individual antennas of a multi-antenna system in a motor vehicle. This device can be coupled to the interfaces of an antenna amplifier containing a diversity system, and such a test can be carried out without any intervention in the circuitry of the receiving installation. The diagnostic device contains a test unit and a control unit. The test unit is designed for generating a test signal that is received by an antenna of the multi-antenna system by a transmitting antenna. The diversity system is acted upon by a control unit having a control signal consisting of an IF-signal and a dc voltage signal. The control signal generated by the control unit by an interference simulator integrated in the control unit is disturbed only when the diversity system is prompted to switch to the next antenna. The received power measured by the test unit on the output of the antenna amplifier can be antenna-specifically detected, stored and evaluated.

6 Claims, 1 Drawing Sheet

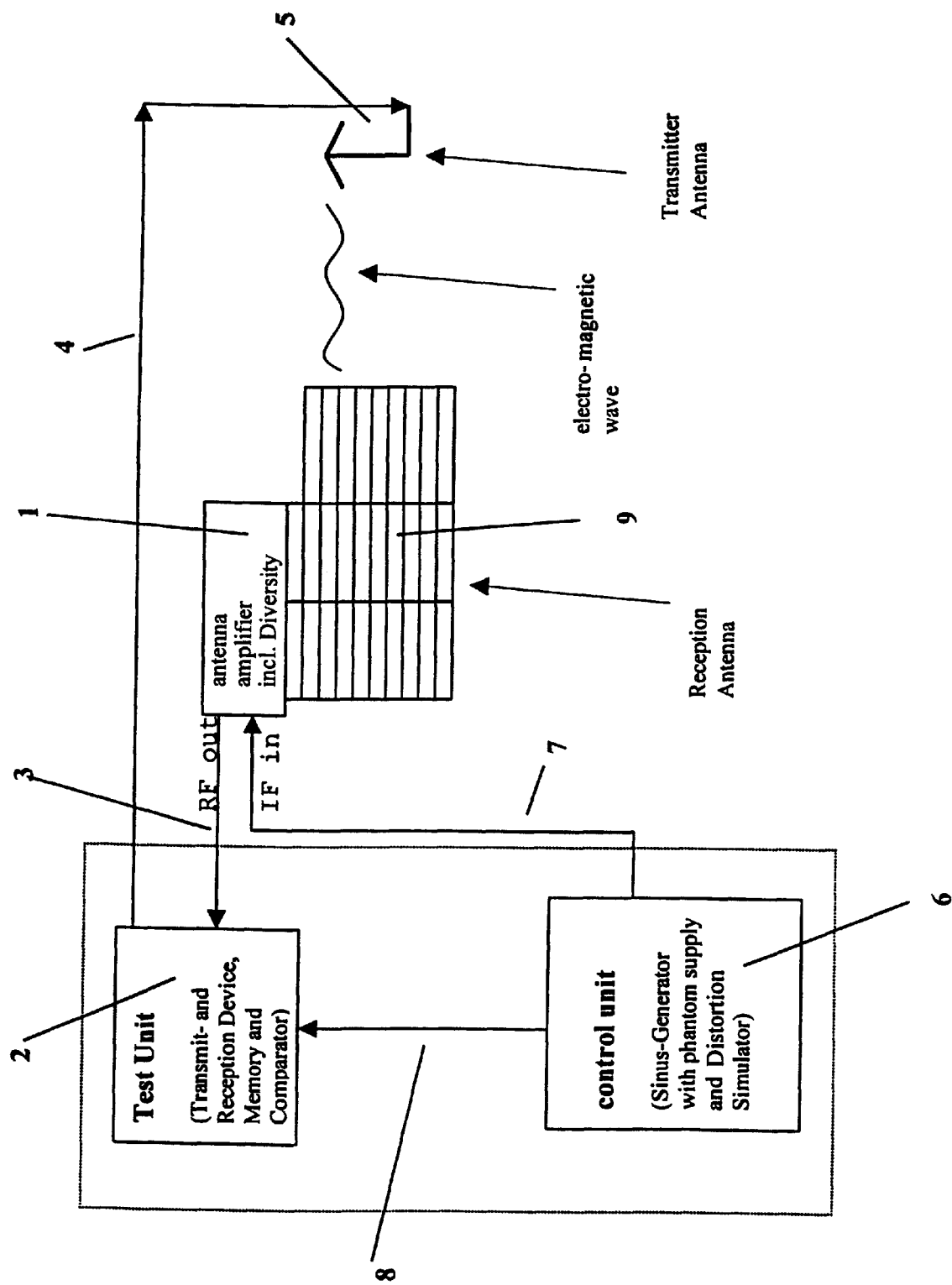

DIAGNOSTIC DEVICE FOR A MULTI-ANTENNA ARRANGEMENT

BACKGROUND OF THE INVENTION

1. Field of the Invention

The invention relates to a diagnostic device for a multi-antenna arrangement with a diversity processor.

2. The Prior Art

When testing active and passive components of a mobile receiver installation, for example a radio receiver, multi-antenna arrangements with antenna diversity are problematic due to differentiated testing of the individual antenna and the condition of the antenna's electrical connections to the radio receiver. In addition, the interfaces available for the tie-up for measuring and testing systems are difficult to access and require extensive dismantling work. It is difficult to determine which antenna is connected at the given time, due to the switching position of the antenna diversities. Antenna determination can not be achieved by measurements of the receiving level on the antenna connection box of the radio receiver because the signal level falls short of a defined preset value in diversity systems. Therefore, the radio receiver is automatically switched via a change-over switch to one of the other antennas where an adequate reception level can be detected.

A circuit arrangement for testing the function of mobile radio reception installations is known from European Patent EP 0 806 849 A2, which can be used with diversity systems as well. This invention discloses a high-frequency signal that is generated by the circuit on the output side. The HF-signal substantially corresponds with the adjusted receiver frequency of the radio receiver and is coupled in via the receiver antenna, whereby the level of the received signal is measured. A switching signal generator is used to sequentially step the antenna switch of a diversity processor. This allows the high-frequency signal to be coupled in by different antennas of the diversity system, and the received power of the individual antenna can be measured. However, this system does not provide a defined starting condition for beginning the function test.

Another circuit arrangement for testing multi-antenna systems is described in German Patent DE 195 13 872 A1. This invention describes an antenna-specific pulse sequence, which is generated either indirectly by the radio receiver, an external testing device, or a special converter circuit, and the change-over switch of the antenna diversity system is switched through to the radio receiver according to the pulse sequence. The pulse sequence can be fed into the diversity system either by the antenna cable or an intermediate frequency output of the radio receiver. The intermediate arrangement of filters separates the test pulses from the main signals transmitted by the lines. A test signal is subsequently transmitted on the same channel, and the receiver conditions of the individual antenna can then be tested by the test signal.

It is essential to this system to intervene with or make changes on the circuitry that relate to the diversity system and/or the radio receiver. Consequently, these systems are not suitable for testing existing radio receiver installations with antenna diversity systems.

SUMMARY OF THE INVENTION

An object of the invention is to create a diagnostic device for multi-antenna systems that provides differentiated testing of the individual antennas of a multi-antenna system without intervening with the circuitry in the receiver installation. This is accomplished by testing two interfaces of the antenna system, namely the intermediate-frequency (IF) input of the diversity processor, and the HF-output of the antenna installation. The two interfaces serve to connect a test unit as well as a control unit, which are external units that can be employed within the framework of the controls at the end of an assembly line, or in auto repair shops. Consequently, this device requires no intervention with the circuitry of passive or active functional elements of the antenna system or the radio receiver. In particular, these systems may be conventional diversity systems whose control signal in the diversity mode consists of an IF-signal, with FM-reception a 10.7 MHz signal, on which a dc voltage component is applied.

The test unit comprises, a transmitting and receiving module and serves to build up an HF-circuit into which the multi-antenna system to be tested is tied. Provision is made for a transmitting antenna for sending the test signal generated by the test unit. The test signal is then fed into the switched-through antenna of the multi-antenna system, and then supplied again to the test unit through the antenna for analysis. The test unit is actively connected to a control unit comprising a signal generator, a dc voltage source and an interference simulator. The control unit supplies the control signal required for the diversity processor, as well as simulating conditions of interference in a defined way. These conditions of interference are defined, depending on the properties and adjustments of the diversity processor, wherein the stepping of the diversity processor to the next antenna is prompted in response to a defined interference. Therefore, the diagnostic device is intended to prompt controlled stepping of the diversity processor according to conditions of interference that are generated by the control unit. The signal received from the test unit reflects the condition of the switched-through antenna, including its lines of connection. It is particularly important to allocate the measurements to individual antennas, so that the function test starts in a reset mode of the diversity processor. This reset mode is first switched through to a defined known antenna, which is the main antenna. Following the tie-up of the control unit, the diversity mode is activated with the gradual application of a dc voltage on the IF control signal, without changing the antenna. A test process that has to be wound off by the interference simulator, in coordination with the test unit, can now be initiated at a particular point in time.

In another example, the control signal is an intermediate-frequency signal, i.e. with FM-reception having a 10.7 MHz signal.

The test signal, which is generated by the test unit, may be similar to the IF-signal. The test unit can log the antenna-specific measuring signals if needed, for comparison to standard values. The measuring signals are represented in a suitable manner, so that the electrical connection lines of individual antennas can be checked, with the help of the record of measurements.

It is advantageous that the control unit and the test unit form one single structural unit. This single unit may be integrated in other test devices as well.

Since the antenna amplifier and the diversity processor frequently form one structural unit, the diagnostic device is tied to the IF-input as well as to the HF-output of a structural unit.

Furthermore, it is essential that only those conditions of interference, which are simulated by the interference simulator, are active over time spans that are shorter than the dwelling time over which an individual antenna fails. This is an important precondition for stepping to the next successive antenna to take place, allowing for a differentiated measuring of each antenna.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

The FIGURE shows a circuit diagram for the differentiated testing of a multi-antenna arrangement with antenna diversity.

DETAILED DESCRIPTION OF THE PREFERRED EMBODIMENT

Referring now in detail to the drawing, there is shown an antenna amplifier installed in a motor vehicle, which also contains a diversity processor. A voltage supply (not shown) is associated with antenna amplifier 1, the multi-antenna arrangement of the vehicle, and its tie-up to the antenna amplifier or amplifiers. Antenna amplifier 1, is also coupled to a reception antenna 9.

External test unit 2 is connected by an HF-cable 3 to the corresponding output of antenna amplifier 1. According to the invention, test unit 2 consists of a transmitting and receiving module, as well as additional modules that are designed for storing, registering, comparing, evaluating and, if need be, visualizing measured data. Test unit 2 is connected to a transmitting antenna 5 by another HF-cable 4. The significance of antenna 5 is explained in greater detail below.

A control unit 6 is connected to the input of antenna amplifier 1 by another HF-line 7. Control unit 6 comprises a signal generator, preferably a sinusoidal signal generator, a dc voltage source and an interference simulator. An interference pulse is made available to the test unit 2 via line 8. The sinusoidal signal generator is designed to generate a frequency of 460 kHz or 10.7 MHz, depending on whether the test is carried out in the AM or FM range. Therefore, a dc voltage, for example 12 volts can be applied to the intermediate frequency. The interference simulator is designed so that the IF-signal generated is distributed for a short time in order to simulate, within a defined time span, a deterioration of the signal to noise spacing. This time span is selected in coordination with corresponding adjustments of the diversity processor, to the extent that it is shorter than the minimum dwell time at an antenna of the multi-antenna arrangement. This is an important precondition for permitting stepping from one antenna to the next in a defined manner.

Known diversity systems are controlled by the intermediate frequency of the receiver and dc voltage signal, whereby the dc voltage signal is employed for activating a diversity mode. This system is advantageous over the prior art since the two signals are generated by components of the module of the receiver. The two interfaces of the antenna amplifier are the IF-input, required for the diversity system, and the HF-output that is intended for the tie-up to the input socket of the receiver. Thus only two interfaces are needed in order to carry out a diagnosis of the multi-antenna system. Test unit 2 and control unit 6 can be external devices that are structurally separated from one another, but which also may form one unit.

Therefore, to carry out a diagnosis, the HF-connections between test unit 2, control unit 6 and antenna amplifier 1 are made first. The diversity system, due to the open interfaces and the absence of a dc voltage signal, remains switched to a certain known antenna, namely the main antenna. An IF-signal with a level of about 40 dBμV is now made available by control unit 6, this signal having an intermediate frequency of 10.7 MHz in case of FM-reception. This signal may be a pure unmodulated sinusoidal signal. A dc voltage signal is gradually applied on the IF-signal so that the diversity system is changed from reset mode to diversity mode, without a change of antenna taking place. This allows an undisturbed signal to be fed into the diversity system. Since the main antenna of the multi-antenna system is known, this provides a defined starting condition in the initial phase of the function test. The IF-signal is disturbed for a short time by the interference simulator, whereby this interference is detected by the diversity system, and triggers stepping to the next successive antenna. Since the interference is present for only a very short time, further stepping takes place only to the antenna directly following within the frame of one cycle.

While these processes take place, a test signal of a defined power is transmitted by test unit 2 within a defined frequency range by transmitting antenna 5. The test signal is received in antenna amplifier 1 by the receiving antenna (not shown) of the multi-antenna arrangement. The receiving data of each antenna is individually measured and evaluated in coordination with control unit 6, by comparing this reception data with standard data, whereby the measured results are stored or visualized.

This diagnostic device offers the advantage that it is possible to carry out an individual test of the individual antennas of a multi-antenna system. This device provides reproducible performance data by the interfaces of an antenna amplifier with a connected diversity system. It is possible to test whether all electrical connections are available between the antenna structures of the motor vehicle and the antenna amplifier up to the receiver.

Accordingly, while only one embodiment of the present invention has been shown and described, it is obvious that many changes and modifications may be made thereunto without departing from the spirit and scope of the invention.

What is claimed is:

1. A diagnostic device for providing test data for a multi-antenna arrangement having a diversity processor, comprising:

a test unit having a transmitting module, for generating a test signal, a transmitting antenna coupled to said transmitting module, a receiving module for receiving said test signal from said antenna, and a storage module coupled to said test unit for storing the test data; and a control unit coupled to said test unit having a signal generator for generating a control signal for the diversity processor, a dc voltage source for applying voltage to said control signal, and an interference simulator to disturb said control signal for a short time span to simulate a deterioration of a control signal's signal-to-noise ratio;

wherein said test unit and said control unit are actively connected to the diversity processor by at least one HF line.

2. The diagnostic device according to claim 1, wherein said control signal is an IF-signal on which said dc voltage is applied.

3. The diagnostic device according to claim 1, wherein said test signal is an IF-signal.

4. The diagnostic device according to claim 1, wherein said test unit and said control unit form one structural unit.

5. The diagnostic device according to claim 1, wherein the diversity processor includes an antenna amplifier having an IF-input, and wherein said test unit is connected to the IF-input of said antenna amplifier, and said control unit is connected to the IF input of said antenna amplifier.

6. The diagnostic device according to claim 1, wherein said interference simulator of said control unit provides an interference signal, applied on said generated control signal during a time span that is shorter than the dwell time controlled by the diversity processor when connected with an individual antenna of the multi-antenna arrangement.

* * * * *